United States Patent Office 2,763,988
Patented Sept. 25, 1956

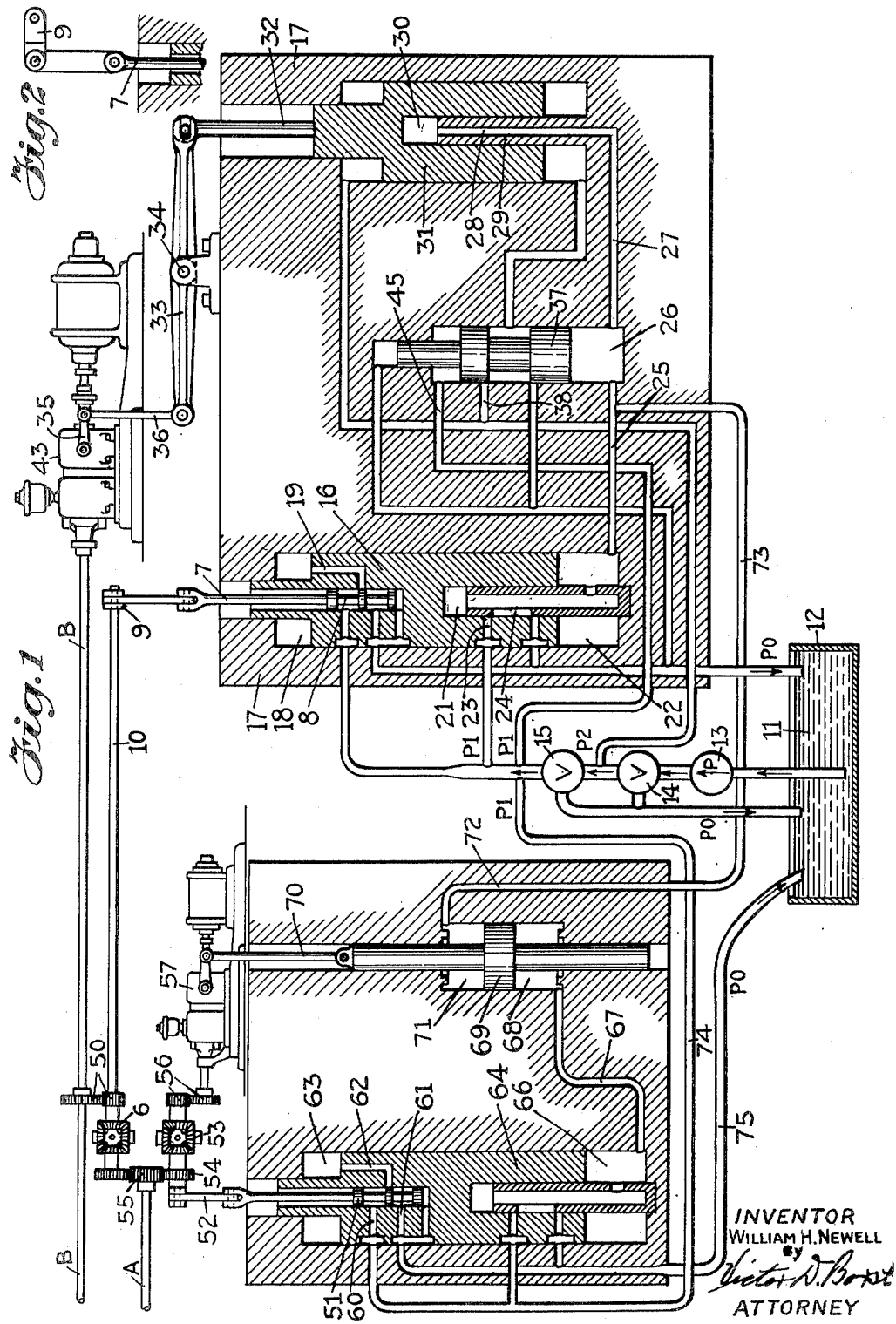

2,763,988

VARIABLE SPEED HYDRAULIC TRANSMISSION

William H. Newell, New York, N. Y., assignor to Sperry Rand Corporation, a corporation of Delaware Application October 10, 1944, Serial No. 557,982

8 Claims. (Cl. 60—53)

This invention relates to motion reproducing mechanisms of the type suitable for stabilizing guns or the like on ships and has for an object to provide a mechanism of the above type which is capable of following a controlling signal with a minimum of lag.

The present invention relates more particularly to a system including an input member which may be responsive to a positioning signal received from an external repeater or the like, control mechanism responsive to movement of the input member, a power driven member and means responsive to the control mechanism for controlling the power driven member, and provides a control mechanism having both a quick acting control which is responsive to the rate of change of position of the received signal and a slower acting control which is responsive to the position represented by the signal. The quick acting response member eliminates the lag which would otherwise be present in the operation of the slower acting response member, particularly when the received signal varies at a rapid or non-uniform rate. The quick acting response member controls the actuation of the driven member so that it is driven at the same speed as the signal and the slower acting response member acts simultaneously to keep the driven member in positional agreement with the signal.

In the embodiment shown, the invention is applied to a hydraulic control mechanism for controlling a variable speed reversible hydraulic transmission. The hydraulic control mechanism includes a response volume generating valve which is actuated by a differential connection between the incoming signal and the driven member. The response volume is used to control a piston which is connected to actuate the control member of the reversible transmission. The hydraulic control mechanism accordingly constitutes a power amplifier which is responsive to a small input energy and generates the amount of power required to control the variable speed transmission.

The quick acting control mechanism is likewise shown as including a hydraulic system having a response volume generating valve actuated by the incoming signal and controlling a piston which is connected to control the operation of the control member of a small variable speed transmission driving a second driven member. The speed of the second driven member is differentially compared with the speed of the signal and is maintained in agreement therewith. This second control system is designed to operate rapidly and constitutes, in effect, a hydraulic tachometer which measures the rate of the incoming signal and utilizes this rate to actuate the piston controlling the control member of the second variable speed transmission so that the position of this piston and the control member represent the speed of the incoming signal.

The speed of the signal as thus determined is applied by a suitable connection to position the control member of the first variable speed transmission quickly so that it operates at the proper speed before any substantial lag develops between the incoming signal and the driven member. In the embodiment shown this connection is a response volume chamber varied in accordance with the position of the control member of the second transmission and connected to modify the response volume of the first system.

Various features and advantages of this invention will be apparent as the nature of the invention is more fully disclosed.

In the drawings:

Fig. 1 is a diagrammatic representation of a hydraulic control system embodying the present invention; and Fig. 2 is a detail view of the valve actuating linkage.

In the embodiment shown in the drawing, the invention is applied to a control system of the type described in my copending application, Serial Number 313,678, filed January 13, 1940 for Motion Reproducing Device which includes an input member A and a driven member B. These members are connected to the two sides of a differential 6, the output or cage of which is transmitted by a shaft 10 to the stem 7 of a pilot valve 8 by a pivoted lever 9 mounted on the shaft 10.

A quantity of oil 11, kept in reservoir 12, is supplied to the valve arrangement as a whole by a constant speed pump 13 through two constant pressure outlet valves 14 and 15 respectively. In practice, the lower pressure from valve 15, indicated as P1, is about half the higher pressure from valve 14, indicated as P2. Pipes and passageways for the drainage of various ports of the valve mechanism contain oil at exhaust pressure indicated as P0.

The operation of the mechanism will be first followed through for a downward movement of valve stem 7 and the pilot valve 8. The pilot valve 8 is located in an axial bore in a piston amplifier valve 16 which is slidable in a recess in valve block 17. Its position is determined by the axial movement of pilot valve stem 7 which permits, by its downward movement, oil under pressure P1 to pass around the enlarged center portion of valve 8 and enter recess 18 by passage 19. This forces piston valve 16 downward.

Upon the descent of piston valve 16, oil is permitted to enter recesses 21 and 22 through the passage 23 and its associated valve port 24. The shape of the port 24 is rectangular and the pressure drop across it is a constant since the pressure in passage 25 is maintained at one-half P1 by the pressure P1 acting on one-half of the top of the piston valve 37 through passage 45. As a result of this the volume of flow through the port 24 is approximately proportional to the opening of the port. The downward motion of piston valve 16 also displaces the oil already in recesses 21 and 22 so that the volume of oil flowing through passage 25 equals the amount of oil displaced by the movement of piston 16 and the amount of oil entering through valve port 24.

This oil enters recess 26 which is connected by passage 27 to an axial passage 28 formed in a tube 29 which forms one wall of a recess 30 in main piston 31. The upper end of the piston 31 is connected by a rod 32 to a lever 33 pivoted on a fulcrum 34. The other end of the lever 33 is connected by the link 36 to the control member 35 of a hydraulic variable speed transmission 43.

One wall of the recess 26 is formed by a piston valve 37 which is moved upward by the oil entering recess 26. The upward movement of valve 37 uncovers the pressure port 38 and allows oil to flow to the chamber below the main piston 31 and thereby cause it to move upward. As soon as piston 31 has moved up so that the volume of recess 30 has increased in proportion to the volume of oil displaced from recess 22, piston 37, operating under pressure P1 supplied through passage 45, moves downward and covers up port 38. It is thus seen that the motion of the main piston 31 is proportional to the quantity of oil passing through passage 27. The main piston 31 moves the control member 35 of the hydraulic variable speed transmission 43 which may be of any convenient type such, for example, as a Waterbury gear or Vickers transmission which is connected to drive the driven member or shaft B at a rate and in a direction which is determined by the movement of the control member 35 from its median position. The volume of oil in recesses 21, 22, 26 and 30 and the interconnecting passages is termed the response volume.

In the operation of the mechanism thus far described, an incoming signal on the input member or shaft A produces a movement of the shaft 10 which actuates the pilot valve 8 to move the piston amplifier valve 16. This movement of the amplifier valve 16 generates a change in the response volume in the recess 22. This change in the response volume is supplied to the recess 26 under the piston valve 37 and to the recess 30 in the piston 31 and acting through piston valve 37 produces a movement of the piston 31 which is proportional to the change in the response volume chamber originating in recess 22. The movement of piston 31 shifts the control member 35 of the variable speed reversible transmission 43 to cause the shaft B to be driven in a direction and at a speed corresponding to the displacement of the piston 31. This movement of the shaft B is applied to the differential 6 by gears 50 to cause the pilot valve 8 to come to rest when the shafts A and B are operating in agreement. The shaft B accordingly follows the movement of the shaft A except for the lag introduced by the control mechanism above described.

In order to overcome this lag the present invention provides a quick acting control mechanism including a second response volume generating valve having a pilot valve 51 driven by a link 52 from one side of a differential 53, one member of which is driven by a gear 54 from a gear 55 on the shaft A. The other side of the differential 53 is driven through gears 56 by a variable speed hydraulic transmission 57 which is similar to the variable speed hydraulic transmission 43 above referred to, but is capable of transmitting only a relatively small amount of power.

The pilot valve 51 controls the flow of high pressure fluid P1 from passage 60 or of exhaust pressure fluid P0 to passage 61 through a passage 62 which connects to a chamber 63 which causes actuation of a piston amplifier valve 64 similar to the valve 16 above described. Movement of the amplifier valve 64 varies the volume in chamber 66 which constitutes a second response volume generating chamber. This chamber 66 is connected by a passage 67 to a chamber 68 which actuates a piston 69 connected by a link 70 to control the control member of the variable speed transmission 57. Movement of the piston 69 also changes the volume of chamber 71 which constitutes a response volume generating chamber and is connected by a passage 72 and duct 73 to the passage 25 connecting the response volume recesses 22, 26 and 30 for controlling the operation of the pilot valve 37 and the piston 31. The passage 60 is connected by a duct 74 to receive liquid under a pressure P1 from the valve 15. The passage 61 is connected by a duct 75 to the oil 11 in reservoir 12.

In the operation of this quick acting control mechanism, movement of the shaft A immediately produces a corresponding movement of the pilot valve 51 which actuates the amplifier valve 64 and through the chambers 66 and 68 causes a corresponding movement of the piston 69 suited to cause the variable speed transmission 57 to drive the differential 53 in a direction and at a rate similar to that of the movement of the shaft A. When this takes place pilot valve 51 comes to rest and piston 69 is displaced from its central position an amount proportional to the speed of the output of the variable speed transmission 57. In so doing, however, a response volume has been generated in the chamber 71 which is a function of the rate of movement of the shaft A. This response volume effects the response volume recess 26 of piston valve 37 to cause a corresponding movement of the piston 31 which controls the output speed of the variable speed transmission 43 before any appreciable speed error develops between the shaft A and the shaft B. If any positional error occurs between shafts A and B a fine adjustment of the drive of the shaft B is then effected by means of the pilot valve 8 as above described.

The constants of the hydraulic system are so selected that the piston 69 operates with extreme rapidity so that the response volume is affected rapidly by the chamber 71, whereas the amplifier valve 16 operates at a comparatively slower rate so that the volume of recess 22 varies at a much slower rate than the response volume chamber 71 and supplements the latter to obtain an accurate positional control without danger of hunting. In this way an accurate control is obtained with extreme rapidity and without appreciable lag, even under adverse operating conditions.

It is to be noted that differential 53, valve 64 and piston 69 control the transmission 57 in a manner to constitute a hydraulic tachometer which generates a response volume 71 varying as a function of the speed of the signal on shaft A. If desired, a mechanical tachometer may be used, in which event the tachometer will be connected mechanically to actuate the piston 69 in accordance with the rate of movement of the shaft A. This mechanical tachometer may take various forms, such as a ball integrator or a magnetic drag. It is also to be understood that the hydraulic or mechanical tachometer may be operated from a second repeater so as to avoid reaction upon the positional control from drive shaft A. In any event, the connection is such as to produce a response volume which is a function of the rate of the signal and which is connected to the response volume recess 26 to control the driven shaft B more rapidly than is possible by the use of the valve 16 alone.

Although a specific embodiment of the invention has been shown and described, it is to be understood that the invention is capable of various uses and that various modifications and adaptations thereof may be made by a person skilled in the art. The invention is only to be limited in accordance with the scope of the following claims.

What is claimed is:

1. A motion reproducing mechanism comprising an input member, the motion of which is to be reproduced, a driven member, variable speed reversible driving means for said driven member, means for measuring the rate of movement of said input member, means controlled by the measuring means to maintain the rate of the driving means in agreement with the rate of the input member, differential means responsive to the relative positions of the input member and the driven member, and means controlled by the differential means and connected to cause the driving means to bring the driven member into positional agreement with the input member.

2. A motion reproducing mechanism comprising an input member the motion of which is to be reproduced, a driven member, variable speed reversible driving means for driving said driven member, a first control for said driving means comprising means responsive to the rate of movement of said input member connected to cause said driving means to operate at a corresponding rate, and a second control for said reversible driving means including a power amplifier responsive to the difference in position between said input member and said driven member and connected to cause said driven member to reproduce the movement of said input member.

3. A motion reproducing mechanism comprising an input member the motion of which is to be reproduced, a driven member, variable speed reversible driving means for driving said driven member, a first control for said driving means comprising a power amplifier driven by said input member, a second reversible drive controlled by said power amplifier, means comparing the output of said second reversible drive with the movement of said input member to actuate said power amplifier in accordance with the differential movement thereof, means responsive to the output of said power amplifier to actuate said first reversible driving means at a rate corresponding to the rate of said input member, and a second control for said reversible driving means including a power amplifier responsive to the difference in position between said input member and said driven member and connected to cause said driven member to reproduce the movement of said input member.

4. A motion reproducing mechanism comprising an input member the motion of which is to be reproduced, a driven member, variable speed reversible driving means for driving said driven member, a first control for said driving means comprising a pilot valve connected to be actuated in response to movement of said input member, a power amplifier valve actuated by said pilot valve, a piston connected to be actuated by said power amplifier valve, a second reversible driving means controlled by said piston, differential means comparing the output of said second reversible driving means with said input member and connected to actuate said pilot valve in accordance with the differential effect thereof, means responsive to movement of said piston to actuate said first driving means at a rate corresponding to the rate of said input member, and a second control for said first reversible driving means including a power amplifier responsive to the difference in position between said input member and said driven member and connected to cause said driven member to reproduce the movement of said input member.

5. A motion reproducing mechanism comprising an input member the motion of which is to be reproduced, a driven member, variable speed reversible driving means for driving said driven member, a first control for said driving means comprising means responsive to the rate of movement of said input member connected to cause said driving means to operate at a corresponding rate, and a second control for said reversible driving means comprising a pilot valve, a differential having inputs connected to said input member and to said driven member and an output connected to actuate said pilot valve, a power amplifier controlled by said pilot valve to generate a response volume, a piston having a response volume chamber connected to be actuated in accordance with said generated response volume, and means connecting said piston to control the operation of said reversible driving means to cause said driven member to reproduce the movement of said input member.

6. A motion reproducing mechanism comprising an input member the motion of which is to be reproduced, a driven member, variable speed reversible driving means for driving said driven member, a first control for said driving means comprising hydraulic means responsive to the rate of movement of said input member to generate a response volume which represents said rate, a piston connected to be actuated in accordance with said generated response volume, means connecting said piston to control the operation of said reversible driving means, a second control for said reversible driving means comprising a pilot valve, a differential having inputs connected to said input member and to said driven member and an output connected to actuate said pilot valve, a power amplifier controlled by said pilot valve to generate a second response volume, and means actuating said piston in response to said second response volume.

7. A motion reproducing mechanism comprising an input member the motion of which is to be reproduced, a driven member, variable speed reversible driving means for driving said driven member, a first control for said driving means comprising a second reversible driving means, a pilot valve, a differential having inputs actuated by said input member and said second reversible driving means and having an output connected to actuate said pilot valve, a power amplifier actuated by said pilot valve to generate a response volume, a piston actuated in response to said response volume to control said second reversible driving means whereby the response volume varies as a function of the rate of movement of said input member, means connecting said piston to control the operation of said first reversible driving means, a second control for said first reversible driving means comprising a second pilot valve, a differential having inputs connected to said input member and to said driven member and an output connected to actuate said second pilot valve, a power amplifier controlled by said second pilot valve to generate a second response volume, and means to actuate said piston in accordance with said second generated response volume.

8. A motion reproducing mechanism comprising a motion input signal, a driven member, reversible driving means for driving the driven member, first power amplifier means differentially actuated by the input signal and the driven member, second power amplifier means actuated by the input signal in accordance with the rate of movement of the input signal, and means jointly actuated by the first power amplifier means and the second amplifier means for controlling the driving means to drive the driven member in accordance with the input signal.

References Cited in the file of this patent

UNITED STATES PATENTS

| | | |
|---|---|---|
| 2,068,490 | Hull | Jan. 19, 1937 |
| 2,160,779 | Granat | May 30, 1939 |
| 2,189,823 | Vickers | Feb. 13, 1940 |
| 2,191,792 | Hill | Feb. 27, 1940 |